2,715,590

PROCESS FOR SIZING NYLON YARN

Francis Joseph Brockman and Owen Clement Wentworth Allenby, McMasterville, Quebec, Canada, assignors, by mesne assignments, to Du Pont Company of Canada Limited, Montreal, Quebec, Canada, a corporation of Canada No Drawing. Application November 24, 1952, Serial No. 322,366

6 Claims. (Cl. 117—138.8)

This invention relates to new and useful polymeric materials and to a method of preparing the same. More particularly it relates to new and useful polyhydroxy compounds and to a method of preparing the same. Still more particularly it relates to new polyhydroxy compounds for use in the textile finishing field and to a method of preparing the same.

It has heretofore been proposed to use polyvinyl alcohol as a sizing agent for various textile materials, more particularly nylon yarn. Polyvinyl alcohol is a preferred material in this respect because it is water-soluble and hence easy to apply to the textile materials, and also because it is not corrosive for the equipment generally used in textile finishing operations. Despite its desirable properties, however, polyvinyl alcohol has one important drawback when used as such for the sizing of nylon in that it does not adhere strongly enough to the yarn and hence has a sizing effect of relatively short duration. It has heretofore been the practice to use polyvinyl alcohol in admixture with boric acid in order to obtain satisfactory adhesion of the polymeric material to the yarn.

It is an object of this invention to provide a new class of polymeric materials having many useful properties. Another object of this invention is to provide new polymeric materials which possess the same desirable properties as polyvinyl alcohol from the standpoints of solubility and corrosiveness, but which are superior to polyvinyl alcohol from the standpoint of adhesion to nlyon yarn in that they need not be used in admixture with another material such as boric acid. Another object of the invention is to provide new polyhydroxy compounds having the said useful properties with respect to nylon yarn due to the presence therein of nylon-adhering carboxylic acid groups. Other objects will appear hereinafter.

The novel polymers of this invention are hydrolyzed copolymers of vinyl acetate and crotonic acid having the empirical formula $$(C_3H_5COOH)_x.(C_2H_3OH)_y.(C_2H_3OOCCH_3)_z$$

wherein $x$, $y$ and $z$ are numbers, the ratio of $y$ plus $z$ to $x$ being within the range of from about 5.5:1 to 19:1 (i. e. the mol ratio of vinyl acetate to crotonic acid in the copolymers prior to hydrolysis being within the range of from about 5.5:1 to 19:1), and the ratio of $y$ to $z$ being at least 1:9 (i. e. the copolymers being at least 10% hydrolyzed), and water-soluble salts of these copolymers. Copolymers hydrolyzed to an extent of at least 60% are soluble as such in water, whereas those hydrolyzed to a lesser extent are water-soluble in the form of their salts, e. g. ammonium salts. The ammonium salts are just as effective sizing agents for nylon yarn as the free acid-type copolymers since they slowly liberate ammonia upon contact with the atmosphere and are thus slowly transformed into the adhering free acid-type copolymers.

These copolymers may be prepared by dissolving copolymers of vinyl acetate and crotonic acid wherein the mol ratio of vinyl acetate to acid is within the range of about 5.5:1 to 19:1 in an aqueous solution containing a large excess of ammonia over the amount theoretically required to neutralize the acetic acid liberated, allowing the solution to stand at room temperature whereby the hydrolysis slowly proceeds to completion and, if the copolymers are desired in the free acid form, evaporating the solution. Under these conditions, the hydrolysis has been found to proceed to 95% completion in two months.

In view of the length of time required for the hydrolysis to proceed to completion under the aforementioned conditions, the copolymers are preferably prepared by heating copolymers of vinyl acetate and crotonic acid wherein the mol ratio of vinyl acetate to crotonic acid is within the range of about 5.5:1 to 19:1 at a temperature of from 80° to 90° C. in an aqueous solution containing a large excess of ammonia over the amount theoretically required to neutralize the acetic acid liberated, cooling the solution at room temperature when about 40% of the acetate groups have been hydrolyzed, allowing the solution to stand at room temperature whereby the hydrolysis slowly proceeds to completion, and, if the copolymers are desired in the free acid form, evaporating the solution. Copolymers hydrolyzed to a lesser extent than 40%, e. g. 10–15%, are obtained by shortening the heating period.

It has been found that, if the vinyl acetate/crotonic acid copolymer solution is maintained at 80°–90° C. for a longer period of time than is necessary for 40% hydrolysis, or if the hydrolysis is carried out at 80°–90° C. in the absence of a large excess of ammonia, there is formation of an alkali-insoluble precipitate, which is believed to be a lactone formed by reaction of the carboxylic acid groups of the crotonic acid units of the copolymer chain with the vicinal hydroxyl groups formed by hydrolysis.

The vinyl acetate/crotonic acid copolymers cannot be hydrolyzed by the methods usually employed for the hydrolysis of polyvinyl acetate, i. e. the alcoholysis or alcohol:ester interchange using either sulphuric acid or sodium hydroxide as catalyst. It has been found that these methods, when used for the hydrolysis of vinyl acetate/crotonic acid copolymers, result in gelation of the solution presumably due to cross-linking of the copolymers by reaction between the carboxylic acid groups and hydroxyl groups of different copolymer chains. The hydrolysis process of this invention therefore represents the application of an entirely new principle.

In a more restricted and preferred embodiment, the copolymers of this invention are prepared by heating copolymers of vinyl acetate and crotonic acid wherein the mol ratio of vinyl acetate to crotonic acid is within the range of about 5.5:1 to 19:1 at a temperature of from 80° to 90° C. in an aqueous solution containing a 100% excess of ammonia over the amount theoretically required to neutralize the acetic acid liberated, cooling the solution to room temperature when about 40% of the acetate groups have been replaced by hydroxyl groups, allowing the solution to stand at room temperature whereby the hydrolysis slowly proceeds to completion, and, if the copolymers are desired in the free acid form, evaporating the solution.

The invention will be more fully understood by reference to the following examples in which the parts given are by weight unless otherwise specified.

*Example 1*

10 parts of crotonic acid were mixed with 190 parts of vinyl acetate and 1.2 parts of benzoyl peroxide and the resultant solution was heated under reflux with simultaneous agitation. After two hours, when the solution had become quite viscous, addition of a solution of 2.8 parts of benzoyl peroxide in 80 parts of butanol and 80 parts of xylene was started. Addition of this solution was made over a 135 minute period as directed by the increasing viscosity of the copolymer solution. After completion of the addition, refluxing was continued for 3 hours, at which time 20 parts of butanol and 20 parts of xylene were added and the heating discontinued. A monomer conversion of 95% was thus obtained. The solvent was removed from the copolymer by distillation under vacuum and the residual copolymer was dissolved in 1% aqueous ammonia as a 10% solution.

30 parts of the copolymer, in the form of the above ammonia solution, were then mixed with 27 parts of concentrated ammonia and the resultant solution was heated to 80°–90° C. in a high pressure cylinder for three hours. Hydrolysis of the acetate groups at this stage was found to be 40% complete by determination of the change in total solids due to the removal of acetate groups. The cylinder was then cooled to room temperature and the solution of partially hydrolyzed copolymers allowed to stand at room temperature. After one and two weeks, the degree of hydrolysis was found to have increased to 50% and 70% respectively.

*Example 2*

To 10 parts of a 90% vinyl acetate/10% crotonic acid copolymer, in the form of a 10% solution in 1% aqueous ammonia, there were added 9 parts of concentrated ammonia and the resultant solution was heated to 80°–90° C. for three hours in a sealed glass tube. The degree of hydrolysis was found to be 35%–40% at this stage. The glass tube was then cooled to room temperature and the solution of partially hydrolyzed copolymer allowed to stand for two weeks at room temperature, at which time the degree of hydrolysis was found to have increased to about 50%.

The following examples illustrate the sizing properties of the hydrolyzed copolymers of this invention.

*Example 3*

Three sheets of cast nylon approximately five inches square were scrupulously cleaned with hot water, alcohol and ether, and then respectively covered with drops of an 8% aqueous sizing solution of polyvinyl alcohol containing boric acid and plasticized with polyethylene glycol, a 6% solution of the 70% hydrolyzed copolymer of Example 1 in 1% aqueous ammonia, and a 6% solution of the 50% hydrolyzed copolymer of Example 2 in 1% aqueous ammonia. After the sizes had dried for one hour at 60° C. the adhesion thereof was tested by probing the deposited drops with a needle. This test was repeated after conditioning the drops for 24 hours in a vessel kept at 70% relative humidity. The adhesion of the hydrolyzed vinyl acetate/crotonic acid copolymers was thus found to be superior to that of polyvinyl alcohol.

*Example 4*

Two samples of nylon yarn were impregnated with 2% and 4% aqueous solutions of polyvinyl alcohol containing boric acid and plasticized with polyethylene glycol, leaving a deposit of 3.30% and 10.40% resin respectively. Four other samples of yarn were also impregnated with 2.3%, 3.2%, 3.9% and 4.5% solutions of the 70% hydrolyzed copolymer of Example 1 in 1% aqueous ammonia, leaving a deposit of 4.55%, 5.98%, 6.78%, and 7.47% copolymer respectively. Finally, three samples of yarn were impregnated with 2.6%, 3.4% and 4.5% solutions of the 50% hydrolyzed copolymer of Example 1 in 1% aqueous ammonia, leaving a deposit of 2.80%, 6.20% and 7.80% copolymer respectively. The resistance to filamenting of the sized yarns was then determined by abrading them over various surfaces until a single broken filament was completely removed from the parent yarn bundle. The results, as determined by the method described in the Journal of Textile Institute, vol. 40, T.303–307 (1949), are tabulated in the following table. The higher the resistance number, the more efficient is the size in protecting the yarn from abrasion.

| Size | Percent Size on Yarn | Resistance to Filamenting |
|---|---|---|
| Polyvinyl alcohol | 3.30 | 0.750 |
| 70% hyd. copolymer | 4.53 | 0.735 |
| 50% hyd. copolymer | 2.80 | 0.720 |
| 70% hyd. copolymer | 5.98 | 0.809 |
| 50% hyd. copolymer | 6.20 | 0.810 |
| 70% hyd. copolymer | 6.78 | 0.910 |
| 50% hyd. copolymer | 7.80 | 0.910 |
| 70% hyd. copolymer | 7.47 | 1.310 |
| Polyvinyl alcohol | 10.40 | 1.600 |

*Example 5*

A sample of nylon yarn was impregnated with a 5% solution in 1% aqueous ammonia of a 15% hydrolyzed copolymer containing, before hydrolysis, 85% vinyl acetate and 15% crotonic acid. After drying for one hour at 90° C., the yarn was found to have 5% hydrolyzed copolymer deposited thereon. Analysis of the ammonia content by distillation with aqueous caustic in the Kjeldahl apparatus indicated 90% of the ammonium salt of the hydrolyzed copolymer to have decomposed to the free acid.

The following examples illustrate the water-solubility of the hydrolyzed copolymers of this invention in their free acid form.

*Example 6*

A 4.2% solution in 4% aqueous ammonia of a 92% hydrolyzed copolymer containing, before hydrolysis, 95% vinyl acetate and 5% crotonic acid, was concentrated by distillation to 17%. A sample of the solution was then acidified to a pH of 2.5 with acetic acid without precipitation of the polymer. A second sample was acidified to a pH less than 2.0 with 20% hydrochloric acid but there was no precipitate formation.

*Example 7*

A 5% solution in 4% aqueous ammonia of a 67% hydrolyzed copolymer containing, before hydrolysis, 95% vinyl acetate and 5% crotonic acid, was acidified to a pH of 4.0 without formation of a precipitate.

In the foregoing examples, the hydrolyzed vinyl acetate/crotonic acid copolymers are prepared and used in solution in dilute aqueous ammonia or, in other words, in the form of their water-soluble ammonium salts. However, as previously mentioned, these copolymers can be prepared in their free acid form by evaporation of the ammonia solution when the hydrolysis has reached the desired degree. As illustrated by Example 5, the ammonium salts of the copolymers slowly liberate ammonia upon contact with the atmosphere and are thus transformed into the free acid-type copolymers. This property accounts for the ability of the copolymers to adhere to nylon yarn when applied to the yarn in the form of their ammonium salts.

Copolymers hydrolyzed to an extent of at least 60% have been found to be soluble in water in their free acid form, as shown by Examples 6 and 7, whereas those hydrolyzed to a lesser extent are only water-soluble in the form of their salts, e. g. ammonium or alkali metal salts. The alkali metal salts are obtained by neutralization of the free acid-type copolymers with an alkali metal hydroxide.

The foregoing examples illustrate the utility of the hydrolyzed vinyl acetate/crotonic acid copolymers of this invention and their ammonium salts as sizing agents for nylon yarn. However, these copolymers in their various degrees of hydrolysis and their various water-soluble salt forms are also suitable for many other useful purposes, such as the thickening of solutions and the manufacture of various moulded articles. The presence of both hydroxyl and carboxyl groups in the copolymers render them capable of cross-linking and hence capable of undergoing transformation from the thermoplastic to thermoset state. This property is particularly important for use of the copolymers as adhesives and protective coatings.

Copolymers hydrolyzed to a lesser extent than 10% do not sufficiently differ from the non-hydrolyzed copolymers to be superior thereto in any respect.

As many apparently widely different embodiments of this invention may be made without departing from the spirit and scope thereof, it is to be understood that the invention is not limited to the specific embodiments thereof except as defined in the appended claims.

The embodiments of the invention in which an exclusive property or privilege is claimed are defined as follows:

1. A process for sizing nylon yarn which comprises impregnating said yarn with a dilute aqueous solution of the ammonium salt of an hydrolyzed copolymer of vinyl acetate and crotonic acid having the empirical formula $$(C_3H_5COOH)_x.(C_2H_3OH)_y.(C_2H_3OOCCH_3)_z$$

wherein $x$, $y$ and $z$ are numbers, the ratio of $y$ plus $z$ to $x$ being within the range of from about 5.5:1 to 19:1 and the ratio of $y$ to $z$ being at least 1:5.5.

2. A process for sizing nylon yarn which comprises impregnating said yarn with a dilute aqueous solution of the ammonium salt of an hydrolyzed copolymer of vinyl acetate and crotonic acid having the empirical formula $$(C_3H_5COOH)_x.(C_2H_3OH)_y.(C_2H_3OOCCH_3)_z$$

wherein $x$, $y$ and $z$ are numbers, the ratio of $y$ plus $z$ to $x$ being 9:1 and the ratio of $y$ to $z$ being at least 1:1.

3. A process for sizing nylon yarn which comprises impregnating said yarn with a dilute aqueous solution of the ammonium salt of an hydrolyzed copolymer of vinyl acetate and crotonic acid having the empirical formula $$(C_3H_5COOH)_x.(C_2H_3OH)_y.(C_2H_3OOCCH_3)_z$$

wherein $x$, $y$ and $z$ are numbers, the ratio of $y$ plus $z$ to $x$ being 19:1 and the ratio of $y$ to $z$ being at least 1:1.

4. Nylon yarn impregnated with a hydrolyzed copolymer of vinyl acetate and crotonic acid having the empirical formula $$(C_3H_5COOH)_x.(C_2H_3OH)_y.(C_2H_3OOCCH_3)_z$$

wherein $x$, $y$ and $z$ are numbers, the ratio of $y$ plus $z$ to $x$ being within the range of from about 5.5:1 to 19:1 and the ratio of $y$ to $z$ being at least 1:5.5, said copolymer being deposited on the yarn in an amount within the range 1 to 10%.

5. Nylon yarn impregnated with a hydrolyzed copolymer of vinyl acetate and crotonic acid having the empirical formula $$(C_3H_5COOH)_x.(C_2H_3OH)_y.(C_2H_3OOCCH_3)_z$$

wherein $x$, $y$ and $z$ are numbers, the ratio of $y$ plus $z$ to $x$ being 9:1 and the ratio of $y$ to $z$ being at least 1:1, said copolymer being deposited on the yarn in an amount within the range 1 to 10%.

6. Nylon yarn impregnated with a hydrolyzed copolymer of vinyl acetate and crotonic acid having the empirical formula $$(C_3H_5COOH)_x.(C_2H_3OH)_y.(C_2H_3OOCCH_3)_z$$

wherein $x$, $y$ and $z$ are numbers, the ratio of $y$ plus $z$ to $x$ being 19:1 and the ratio of $y$ to $z$ being at least 1:1, said copolymer being deposited on the yarn in an amount within the range 1 to 10%.

References Cited in the file of this patent

UNITED STATES PATENTS 2,263,598     Starck et al. _____ Nov. 25, 1941

FOREIGN PATENTS 499,917     Belgium _____ Dec. 30, 1950